United States Patent
Bernat et al.

(10) Patent No.: US 9,983,996 B2
(45) Date of Patent: May 29, 2018

(54) TECHNOLOGIES FOR MANAGING CACHE MEMORY IN A DISTRIBUTED SHARED MEMORY COMPUTE SYSTEM

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Brian Slechta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 14/965,487

(22) Filed: Dec. 10, 2015

(65) Prior Publication Data

US 2017/0168942 A1 Jun. 15, 2017

(51) Int. Cl.
| | | |
|---|---|---|
| *G06F 12/123* | (2016.01) | |
| *G06F 12/0831* | (2016.01) | |
| *G06F 12/128* | (2016.01) | |
| *G06F 12/084* | (2016.01) | |
| *G06F 12/12* | (2016.01) | |

(52) U.S. Cl.
CPC ........ *G06F 12/0833* (2013.01); *G06F 12/084* (2013.01); *G06F 12/123* (2013.01); *G06F 12/128* (2013.01); *G06F 12/12* (2013.01); *G06F 2212/1021* (2013.01); *G06F 2212/314* (2013.01); *G06F 2212/621* (2013.01)

(58) Field of Classification Search
CPC .. G06F 12/0833; G06F 12/084; G06F 12/123; G06F 12/128; G06F 12/12; G06F 2212/1021; G06F 2212/314; G06F 2212/621
See application file for complete search history.

(56) References Cited

U.S. PATENT DOCUMENTS 7,143,412 B2 * 11/2006 Koenen ................. G06F 9/5044
  718/102
2003/0188106 A1 * 10/2003 Cohen ................. H04L 67/1095
  711/133

* cited by examiner

*Primary Examiner* — Eric Cardwell
(74) *Attorney, Agent, or Firm* — Barnes & Thornburg LLP

(57) ABSTRACT

Technologies for managing cache memory of a processor in a distributed shared memory system includes managing a distance value and an age value associated with each cache line of the cache memory. The distance value is indicative of a distance of a memory resource, relative to the processor, from which data stored in the corresponding chance line originates. The age value is based on the distance value and the number of times for which the corresponding cache line has been considered for eviction since a previous eviction of the corresponding cache line. Initially, the age value is set to the distance value. Additionally, every time a cache line is accessed, the age value associated with the accessed cache line is reset to the corresponding distance value. During a cache eviction operation, the cache line for eviction is selected based on the age value associated with each cache line. The age values of cache lines not selected for eviction are subsequently decremented such that even cache lines associated with remote memory resources will eventually be considered for eviction if not recently accessed.

26 Claims, 7 Drawing Sheets

TECHNOLOGIES FOR MANAGING CACHE MEMORY IN A DISTRIBUTED SHARED MEMORY COMPUTE SYSTEM

BACKGROUND

Distributed shared memory systems provide a pool of available memory resources that are usable by each processor of the system. Some of the memory resources may be local to a particular processor, while other memory resources may be remote. For example, in some cases, the remote memory resources are accessible over a suitable fabric network. As the communication latencies of fabric networks continue to decline, the usability of such distributed shared memory systems increases. For example, many distributed shared memory systems may be easily scalable to provide increased memory resources as the network of nodes increases.

Due to the distributed nature of the memory resources, each memory resource of a distributed shared memory system may have a different latency or "temporal cost" to access the corresponding memory resource. For example, memory resources local or closer to a particular processor generally may be accessed quicker than those located remote therefrom.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
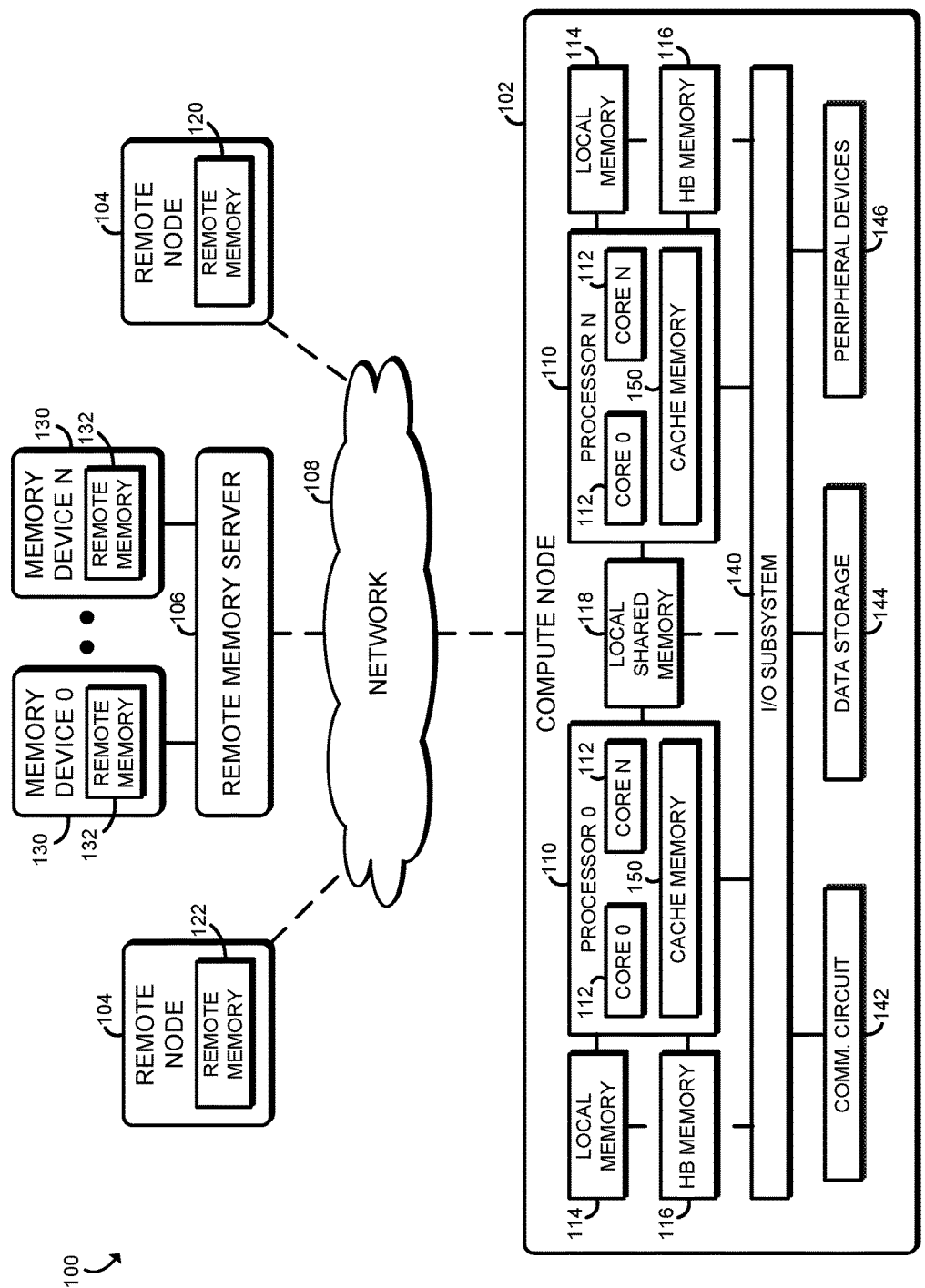
FIG. 1 is a simplified block diagram of at least one embodiment of a distributed shared memory system including a compute node.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative distributed shared memory system 100 includes a compute node 102, one or more remote nodes 104, and one or more remote memory servers 106, each of which are communicatively coupled by a network 108. Each of the compute node 102, remote nodes 104, and remote memory servers 106 may share memory resources with each other via non-uniform memory access (NUMA), although networked data sharing schemes can be used such as a remote direct memory access (RDMA), Fabric Interconnects, and/or other networked data sharing schemes and/or protocols. For example, the compute node 102 includes one or more processors 110, each of which includes one or more processor cores 112 and cache memory 150 associated with the processor core(s) 112. Each processor 110 may also have access to dedicated local memory 114 and/or other local memory resources such as a high-bandwidth memory 116. The high-bandwidth memory 116 may be embodied as, for example, stacked DRAM memory or other high-bandwidth memory. In some embodiments, the high-bandwidth memory 116 may be included within the corresponding processor 110 (e.g., serving as a multi-gigabyte last level cache or the like).

Additionally, in some embodiments, the compute node 102 may include a local shared memory 118, which may be shared between the processors 110 of the compute node 102. Each of the local memory 114, high-bandwidth memory 116, and local shared memory 118 may form a portion of memory resources available to a processor 110 of the compute node 102 and from which the processor 110 may retrieve data for storage in its associated cache memory 150 during operation. Additionally, the distributed shared memory system 100 provides additional memory resources located remotely from the compute node 102. For example, each remote node 104 may include remote memory 122, which may be accessible to the processor(s) 110 of the compute node 102 via the network 108. Additionally, the remote memory server 106 may provide access to various memory devices 130, each of which may include remote memory 132. As such, the remote memory 122, 132 may embody additional resources available to a processor 110 of the compute node 102 and from which a processor 110 may retrieve data for storage in its associated cache memory 150 during operation. In this way, the distributed shared memory system 100 provides each processor core 112 of each processor 110 of the compute node 102 with multiple levels of potentially non-uniform memory accesses.

It should be appreciated, however, that each memory resource of the distributed shared memory system 100 may have a different communication latency, temporal cost, and/or other varying criteria associated with it. For example, a memory resource located near a particular processor 110 (e.g., local memory 114, high-bandwidth memory 116, or local shared memory 118) may have a lower latency relative to a memory resource located remotely from the processor 110 (e.g., remote memory 122 or remote memory 132). Of course, the varying distances associated with the various memory resources of the distributed shared memory system 100 can increase latencies for the processor(s) 110 of the compute node 102 when accessing its cache memory 150. For example, if data originating from a memory resource located far away from the compute node 102, or otherwise exhibiting an increased communication latency, is continuously evicted from the cache memory 150 and subsequently restored, the performance of the corresponding processor 110 may suffer due to lost process cycles of the processor 110 as it waits for the data to be retrieved from the remote memory resource.

As such, in use, each processor 110 of the compute node 102 is configured to manage the associated cache memory 150 to evict data based on, or otherwise taking into account, the identity of the memory resource from which the data originated or was obtained. For example, in the illustrative embodiment, each processor 110 is configured to determine a distance value for each cache line of cache memory 150 in which data is stored based on the memory resource from which the corresponding data was obtained. As discussed in more detail below, the distance value is indicative of a cost for retrieving the corresponding data from its home memory resource. For example, the distance value may be based on the physical distance of the corresponding memory resource from the particular processor 110, the temporal latency or cost associated with accessing the data at the corresponding memory resource (i.e., some physically close memory resources may exhibit greater latencies than more remote memory resources), and/or other criteria or cost associated with retrieving the data from its home memory resource.

As discussed in more detail below, the processor(s) 110 of the compute node 102 utilizes the distance data to determine which line of cache memory 150 to evict during an eviction process. For example, each processor 110 may be configured to select those cache lines of the cache memory 150 having data from more local memory resources over those having data from more remote memory resources for possible eviction. However, to ensure stale data from remote memory resources is eventually considered for eviction, each processor 110 manages an age value associated with each cache line of the cache memory 150. The age value is based on the distance value (e.g., initially set equal to the distance value) and is decremented each time the corresponding cache line is considered for eviction. As such, during an eviction process, each processor 110 determines a set of possible eviction candidates based on the age value associated with each cache line of the cache memory 150 (e.g., each cache line of the lowest-tier age may be considered). The processor 110 then selects one or more cache lines from the set of possible eviction candidates for eviction based on a suitable eviction policy, such as a Least Recently Used eviction policy. After the eviction process is complete, the age value of all cache lines considered for eviction, but not evicted, is decremented. However, if a particular cache line is accessed by the processor 110 during operation, the age value associated with the cache line is reset to be equal the distance value associated with the particular cache line. In this way, cache lines having data from more local memory resources (or from less costly memory resources) may be considered more often for eviction than those from more remote memory reduces, although even the data from more remote memory resources may be considered for eviction over time if the data becomes stale (i.e., not accessed frequently). As such, the retrieving of temporally expensive data from remote memory resources of the distributed shared memory system 100 may be reduced, which may increase the speed and/or performance of the processor(s) 110 of the compute node 102

The compute node 102 may be embodied as any type of computer or computing device having a cache memory and capable of performing the functions described herein. For example, the compute node 102 may be embodied as a server, a computer, a multiprocessor system, a processor-based system, a desktop computer, a tablet computer, a notebook computer, a laptop computer, or any other computing device capable of managing a cache memory in a distributed shared memory system. Although the illustrative distributed shared memory system 100 includes a single compute node 102, it should be appreciated the distributed shared memory system 100 may include multiple compute nodes 102 in other embodiments.

As shown in FIG. 1, the compute node 102 illustratively includes the processors 110, the local memories 114, the high-bandwidth memories 116, the local shared memory 118, an I/O subsystem 140, a communication circuit 142, a data storage 144, and one or more peripheral devices 146 in some embodiments. Of course, the compute node 102 may include other or additional components, such as those commonly found in a computer (e.g., various input/output devices), in other embodiments. Additionally, in some embodiments, one or more of the illustrative components may be incorporated in, or otherwise form a portion of, another component.

Although the illustrative compute node 102 includes multiple processors 110, it should be appreciated that the compute node 102 may include one or more processors 110 in other embodiments. Each processor 110 may be embodied as any type of processor capable of performing the functions described herein. For example, each processor 110 may be embodied as a single or multi-core processor(s), a single or multi-socket processor, a digital signal processor, a microcontroller, or other processor or processing/controlling circuit. Illustratively, each processor 110 is embodied as a multi-core processor having multiple processor cores 112 and the associated cache memory 150, which is managed during operation of the processor 110 as described in detail below.

Each of the local memory 114, high-bandwidth memory 116, and shared memory 118, may be embodied as any type of suitable memory, including volatile and/or non-volatile memory, capable of performing the functions described herein. In operation, the memories 114, 116, 118 may store various data and/or software used during operation of the compute node 102 such as operating systems, applications, programs, libraries, and drivers. Of course, in some embodiments, the compute node 102 may not include one or more of the memories 114, 116, 118 or include additional or other memories.

Each processor 110 and the memories 114, 116, 118 may be communicatively coupled to other components of the compute node 102 via the I/O subsystem 140, which may be embodied as circuitry and/or components to facilitate input/output operations with the processor 110, the memories 114, 116, 118, and other components of the compute node 102. For example, the I/O subsystem 140 may be embodied as, or otherwise include, memory controller hubs, input/output control hubs, firmware devices, communication links (i.e., point-to-point links, bus links, wires, cables, light guides, printed circuit board traces, etc. and/or other components and subsystems to facilitate the input/output operations. In some embodiments, the I/O subsystem 140 may form a portion of a system-on-a-chip (SoC) and be incorporated, along with the processors 110, the memories 114, 116, 118, and/or other components of the compute node 102, on a single integrated circuit chip.

The communication circuit 142 may be embodied as any type of communication circuit, device, or collection thereof, capable of enabling communications between the compute node 102 and remote nodes 104, the remote memory server 106, and/or other components of the distributed shared memory system 100. To do so, the communication circuit 142 may be configured to use any one or more wired or wireless communication technology and associated protocols (e.g., Ethernet, Bluetooth®, 3GPP LTE, etc.) to effect such communication.

The data storage 144 may be embodied as any type of device or devices configured for the short-term or long-term storage of data. For example, the data storage 144 may include any one or more memory devices and circuits, memory cards, hard disk drives, solid-state drives, non-volatile memory, or other data storage devices.

In some embodiments, the compute node 102 may further include one or more peripheral devices 146. Such peripheral devices 146 may include any type of peripheral device commonly found in a server or computer device, for example, a hardware keyboard, input/output devices, touch screen display, display, peripheral communication devices, and/or other peripheral devices.

Each of the remote nodes 104 may be embodied any type of computer or computer system having a remote memory 122 capable of forming a portion of the distributed shared memory of the distributed shared memory system 100. For example, each remote node 104 may be embodied as a server, a computer, a multiprocessor system, a processor-based system, a desktop computer, a tablet computer, a notebook computer, a laptop computer, or any other computing device. As such, each remote node 104 may include components commonly found in such devices, such as one or more processors, other memories, I/O subsystems, and/or the like. Such components may be substantially similar to like components of the compute node 102, the description of which is equally applicable to the corresponding components of the remote nodes 104 and is not repeated herein for clarity of the description. Although the illustrative distributed shared memory system 100 includes two remote nodes 104, it should be appreciated that the distributed shared memory system 100 may include additional remote nodes 104 in other embodiments.

The remote memory server 106 may be embodied as any type of server computer capable of providing access to the associated memory devices 130 and their corresponding remote memories 132. Each of the memory devices 130 may be embodied as individual compute nodes, memory modules, or other devices capable of managing their associated remote memory 132 to form a portion of the distributed shared memory of the distributed shared memory system 100. The remote memory server 106 and memory devices 130 may include components commonly found in such devices, such as one or more processor, other memories, I/O subsystems, and/or the like. Such components may be substantially similar to like components of the compute node 102, the description of which is equally applicable to the corresponding components of the remote memory server 106 and/or memory devices 130 and is not repeated herein for clarity of the description. Although the illustrative distributed shared memory system 100 includes a single remote memory server 106, it should be appreciated that the distributed shared memory system 100 may include remote memory servers 106 in other embodiments.

As discussed above, the compute node 102 is configured to communicate with the remote nodes 104 and/or remote memory server 106 via the network 108. The network 108 may be embodied as any type of network capable of facilitating communication between the devices of the distributed shared memory system 100. In the illustrative embodiment, the network 108 is embodied as a fabric interconnect, but may include or be embodied as other types of networks and/or networking technology in other embodiments. Additionally, the network 108 may include any number of additional computing devices (i.e., networking devices), physical and/or virtual, that may be commonly found in networks, such as servers, switches, routers, access points, network controllers, etc., that are not shown in FIG. 1 for clarity of the description. It should be appreciated that, in some embodiments, the network 108 may be embodied as any type of parallel and/or distributed computing architecture (e.g., a high performance computing (HPC) network architecture) that is capable of high-speed, low-latency interconnectivity, such as a cluster computing network architecture and/or a grid computing network architecture (e.g., a fabric computing network architecture).

Figure 2:
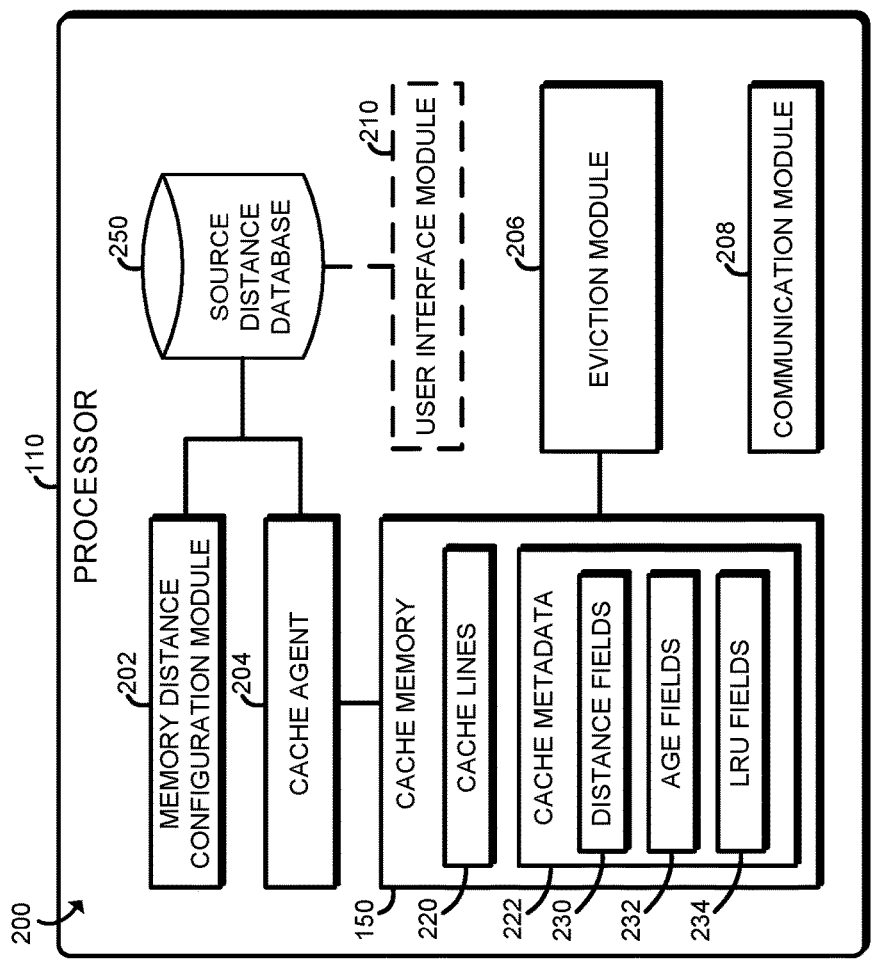
FIG. 2 is a simplified block diagram of at least one embodiment of an environment that may be established by a processor of the compute node of the system of FIG. 1.

Referring now to FIG. 2, in use, each processor 110 of the compute node 102 may establish an environment 200. The illustrative environment 200 includes a memory distance configuration module 202, a cache agent 204, an eviction module 206, a communication module 208, and a user interface module 210 in some embodiments. Each of the modules and other components of the environment 200 may be embodied as firmware, software, hardware, or a combination thereof. For example the various modules, logic, and other components of the environment 200 may form a portion of, or otherwise be established by, the processor 110 or other hardware components of the compute node 102. As such, in some embodiments, any one or more of the modules of the environment 300 may be embodied as a circuit or collection of electrical devices (e.g., a memory distance configuration circuit 202, a cache agent circuit 204, and an eviction circuit 206, etc.).

The memory distance configuration module 202 is configured to establish, manage, and update a source distance database 250. The source distance database 250 may be embodied as any type of data structure, such as a table, flat file, relational database, or the like, capable of cross-referencing memory resources with assigned distance values. For example, in the illustrative embodiment, the source distance database 250 correlates memory resource identification values (e.g., node IDs) with an assigned distance value. The distance values for each of the memory resources included in the source distance database 250 are assigned or managed by the memory distance configuration module 202. For example, in some embodiments, the memory distance configuration module 202 may be configured to assign a default value to each memory resource and adaptively update the value over time based on the latency associated with the particular memory resource. Additionally or alternatively, the user interface module 210 may establish or provide a user interface on the compute node 102 to allow a user to set, modify, or otherwise assign distance values to each of the available memory resources. In this way, the user may take into account special considerations and weigh each memory resources differently (i.e., the user may take into account other criteria in addition or alternatively to the distance of the memory resource from the particular processor 110) to thereby modify the eviction policy. As such, as discussed above, it should be appreciated that the distance value may be directly indicative of the physical distance of the corresponding memory resource of the distributed shared memory system 100 from a particular processor and/or based on other criteria that may be indicative of, or dependent on, such physical distance, such as communication latency.

The cache agent 204 is configured to manage the cache memory 150 associated with the processor 110 and ensure cache coherency across the distributed shared memory system 100. To do so, among other functionality, the cache agent 204 is configured to retrieve requested data from a memory resource of the distributed shared memory system 100 and determine the assigned distance value for that particular memory resource based on the source distance database 250. For example, the cache agent 204 may compare an identification of the memory resource, such as a node ID, to the source distance database 250 to determine the distance value associated with that particular memory resource. The cache agent 204 may then store the retrieved data in a cache line 220 of the cache memory 150 and store the determined distance value in a distance field 230 of a cache metadata 222 associated with the particular cache line 220. Additionally, as discussed above, the cache agent initially sets an age field 232 of the cache metadata to the determined distance value. If data is retrieved or otherwise accessed from a particular cache line 220 during operation of the processor 110, the cache agent 204 updates the age field 232 to be equal to the distance value as discussed above. In the illustrative embodiment, the distance field 230 and the age field 232 may form a portion of the Least Recently Used field 234 of the cache metadata 222. Of course, in other embodiments, the distance fields 230 and age fields 232 may form a portion of other data or data structure. For example, in some embodiments, the distance fields 230 and age fields 232 may be stored in a separate data structure. In some embodiments, the cache metadata 222 may be stored outside of the cache memory 150 in another memory device.

The eviction module 206 is configured to select, when needed, cache lines 220 of the cache memory 150 for eviction. To do so, as discussed in more detail below, the eviction module 206 determines a set of candidate cache lines 220 for eviction based on the age value of the age field 232 associated with each cache line 220. That is, the eviction module 206 considers each cache line 220 having that lowest tier age value (e.g., the stalest data) for possible eviction. The eviction module 206 may then apply an eviction policy to the determined set of eviction candidate cache lines 220 to select a particular cache line 220 for eviction. For example, in the illustrative embodiment, the eviction module 206 applies a Least Recently Used eviction policy to the determined set of candidate cache lines 220 to select the cache line 220 that has been the least recently accessed. After the selected cache line 220 has been evicted, the eviction module 206 decrements the age value of each cache line 220 that was considered for eviction. In this way, as discussed above, data from local memory resources is considered for eviction more often, and data from remote memory resources is eventually considered for eviction as that data becomes stale or otherwise unused.

The communication module 208 is configured to facilitate communications between the processor 110 and/or compute node 102 and other components of the compute node 102 and/or nodes of the system 100. For example, the communication module 208 may facilitate communications, via the communication circuit 142, between the compute node 102 and a remote node 104 and/or the remote memory server 106. In some embodiments, the communication module may be established by or otherwise form a portion of the communication circuit 142 (e.g., rather than each processor 110).

Figure 3:
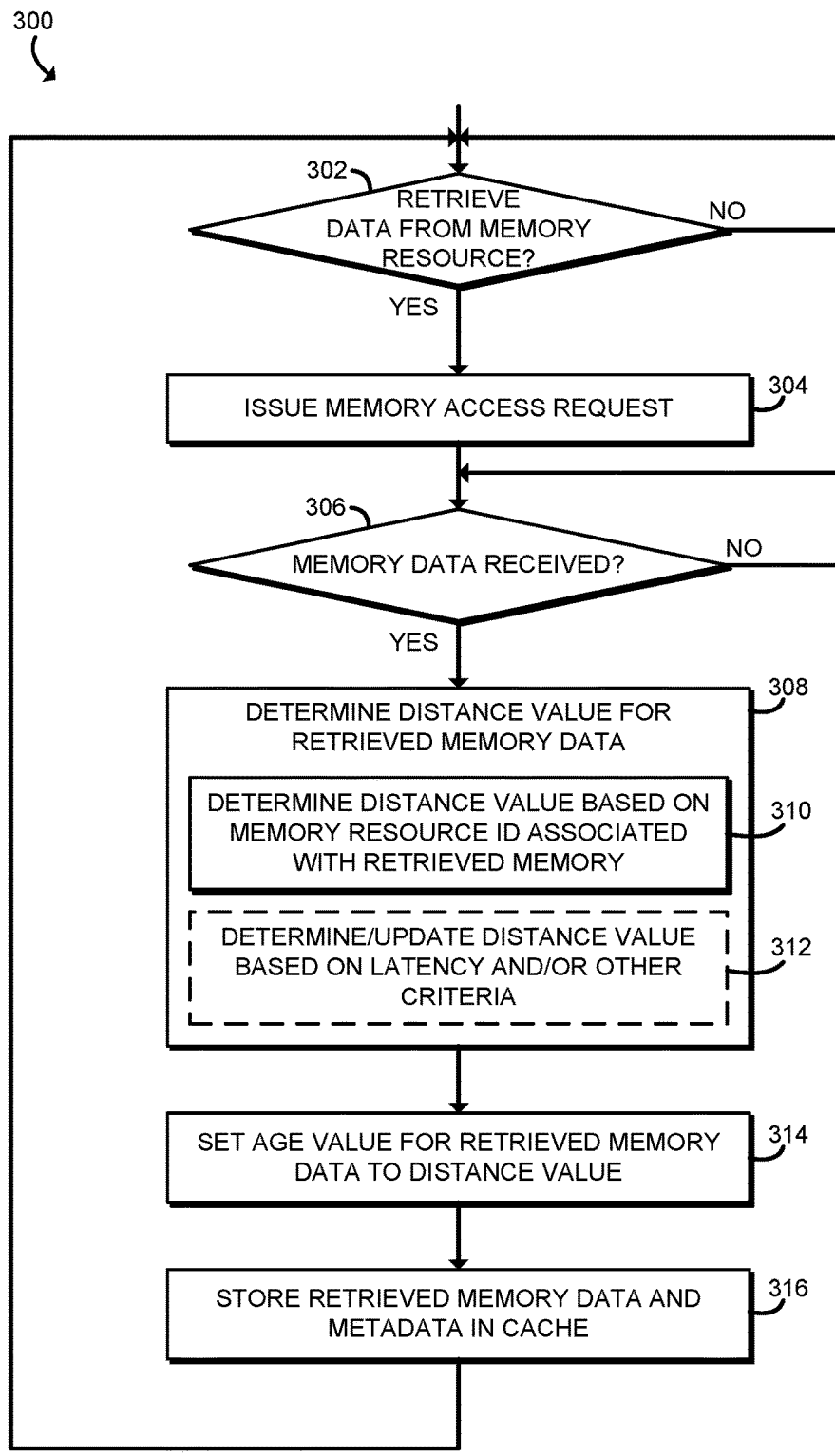
FIG. 3 is a simplified flow diagram of at least one embodiment of a method for retrieving data from a memory of the distributed shared memory system of FIG. 1 that may be executed by the processor of FIG. 2.

Referring now to FIG. 3, in use, each processor 110 may execute a method 300 for retrieving data from a non-cache memory resource of the distributed shared memory system 100. The method 300 begins with block 302 in which the processor 110 determines whether to retrieve data from a non-cache memory resource. The memory resource may be a local memory resource (e.g., a memory local to the compute node 102 such as the local memory 114, the high-bandwidth memory 116, or the local shared memory 118) or a remote memory resource (e.g., a memory remote from the compute node 102 such as remote memory 122 or remote memory 132). For example, in the illustrative embodiment, the processor 110 may determine to retrieve data from the memory resource in response to a determination that that requested data (e.g., data required by an application or serviced executed by the processor 110) is not stored in the local cache memory 150.

If the data is not to be retrieved from a memory resource other than the local cache memory 150, the method 300 loops back to block 302 to continue to monitor for data retrieval from a memory resource. However, if the data is to be retrieved by the memory resource, the method 300 advances to block 304 in which the processor 110 issues a memory access request for the desired data. For example, if the data is located at one of the remote memories 122, the processor 110 may issue a memory access request to the corresponding remote node 104. Subsequently, in block 306, the processor 110 waits to receive the requested data from the memory resource. Once the requested data is received, the method 300 advances to block 308 in which the processor 110 (e.g., the cache agent 204) determines a distance value to be assigned to the data based on the memory resource from which the received data was obtained. As discussed above, the distance value may be directly indicative of the distance of the corresponding memory resource from the processor 110, indicative of a communication latency experienced while retrieving the data, and/or indicative of other cost factors related to the retrieval of the requested data from the corresponding memory resource.

In the illustrative embodiment, the processor 110 determines the distance value based on the identification of the memory resource (e.g., a node ID) from which the data was retrieved in block 310. For example, the processor 110 may compare the identification of the memory resource from which the data was obtained to the source distance database 250 to determine the assigned distance value. Additionally or alternatively, in block 312, the processor may update or modify the determined distance value based on other criteria, such as the latency experienced in retrieving the data, a user-supplied weighting factor, and/or other criteria. For example, in some embodiments, each memory resource may be a assigned default distance value that is further updated or modified in block 312 based on the latency experienced in retrieving the data at that particular time. In this way, in some embodiments, the assigned distance values may be adaptive or otherwise change over time based on the present communication characteristics of the distributed shared memory system 100.

After the distance value for the retrieved data has been determined in block 308, the method 300 advances to block 314 in which the processor 110 sets the age value for the retrieved data. To do so, as discussed above, the processor 110 is configured to initially set the age value for the retrieved data equal to the distance value as determined in block 308. Subsequently, in block 316, the processor 110 stores the retrieved data in one or more memory cache lines 220 of the cache memory 150 and stores the determined distance value in the distance filed 230 and the age value in the age field 232 of the cache metadata 222 associated with the one or more memory cache lines 220. The method 300 then loops back to block 302 in which the processor 110 continues to monitor for a request to retrieve additional data for a memory resource of the distributed shared memory system 100.

Figure 4:
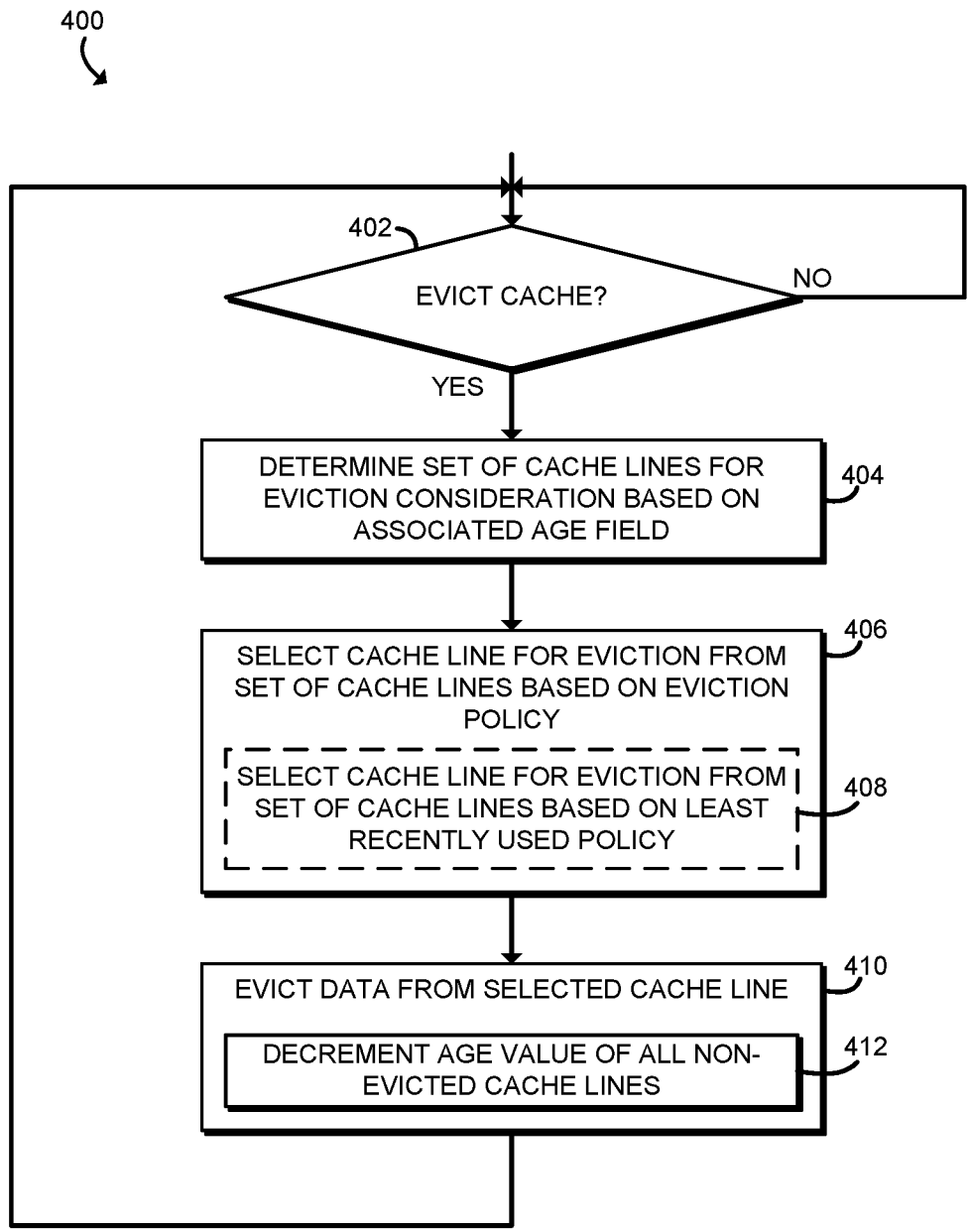
FIG. 4 is a simplified flow diagram of at least one embodiment of a method for evicting cache memory that may be executed by the processor of FIG. 2.

Referring now to FIG. 4, in use, each processor 110 of the compute node 102 may execute a method 400 for evicting data from the associated cache memory 150 based on the memory resource from which the data was obtained. The method 400 begins with block 402 in which the processor 110 determines whether to evict data from the cache memory 150. The processor 110 may employ any suitable mechanism to determine when eviction of data from the cache memory 150 is required or otherwise desirable. For example, in some embodiments, the processor 110 may determine to evict data from the cache memory 150 in response to the storage capacity of the cache memory 150 reaching a reference lower threshold. Alternatively, in other embodiments, the processor 110 may be configured to evict data from the cache memory 150 periodically or in response to other criteria.

If the processor 110 determines that data is to be evicted from the cache memory 150, the method 400 advances to block 404 in which the processor 110 determines a set of cache lines 220 of the cache memory 150 for consideration for eviction based on the age value associated with each cache line 220 of the cache memory 150. As discussed above, the age value of each cache line 220 is initially set to the corresponding distance value, such that memory resources located closer to the processor 110 (and likely to have lower latencies) are considered for eviction more often than memory resources located farther from the processor 110. However, the age value is also decremented or updated such that stale data, even from remote memory resources, is eventually considered for eviction.

Figure 6:
FIGS. 6-8 are simplified block diagrams of an example of cache metadata associated with the processor of FIG. 2 during execution of the method of FIG. 4.

In the illustrative embodiment, the processor 110 selects those cache lines 220 of the cache memory 150 having the lowest age value for consideration for eviction. For example, an illustrative cache metadata 222 that may be associated with a set of cache lines 220 of the cache memory 150 during operation of the processor 110 is shown in FIG. 6. Each cache line 220 is identified by its corresponding address and the associated metadata 222 includes a distance value 602, an age value 604, and a Least Recently Used value 606. For example, the cache data stored at address 0x2fdf220 originates from a memory resource identified as location 1 and has a distance value 602 of 1 and a corresponding age value 604 of 1. As such, the memory resource of location 1 is likely a local memory resource or otherwise located near the processor 110. Conversely, the cache data stored at address 0x2fdf22f originates from a memory resource identified as location 3 and has a distance value 602 of 3 and a corresponding age value 604 of 3. As such, the memory resource of location 3 is likely a remote memory resource or otherwise located remotely from the processor 110.

Referring back to block 404 of FIG. 4 and given the metadata presented in FIG. 6, the processor 110 would select the cache lines 220 associated with locations 1, 4, and 5 (addresses 02fdf220, 0x2fdf240, and 0x2fdf32a, respectively) for possible eviction as those three cache lines 220 have the lowest age value 604 (i.e., an age value of 1) of the present cache lines 220. After the processor 110 has selected the set of cache lines 220 for possible eviction based on the associated age values, the method 400 advances to block 406 in which the processor 110 selects a cache line 220 for eviction from the set of cache lines 220 determined in block 404 based on an eviction policy. To do so, the processor 110 may utilize any suitable eviction policy to select one or more cache lines 220 from the set of cache lines 220 determined in block 404 for eviction. For example, in block 408 in the illustrative embodiment, the processor 110 is configured to select one or more cache lines 220 from the set of cache lines 220 based on a Least Recently Used eviction policy. That is, the processor 110 selects those cache lines 220 that have been accessed the least. For example, referring back to the illustrative example of FIG. 5, the processor 110 would select the cache line 220 associated with the location 4 for eviction because that cache lines 220 has a Least Recently Used value 606 of 0 compared to the Least Recently Used value 606 of 1 for the cache line 220 associated with the locations 1 and 5.

Figure 7:
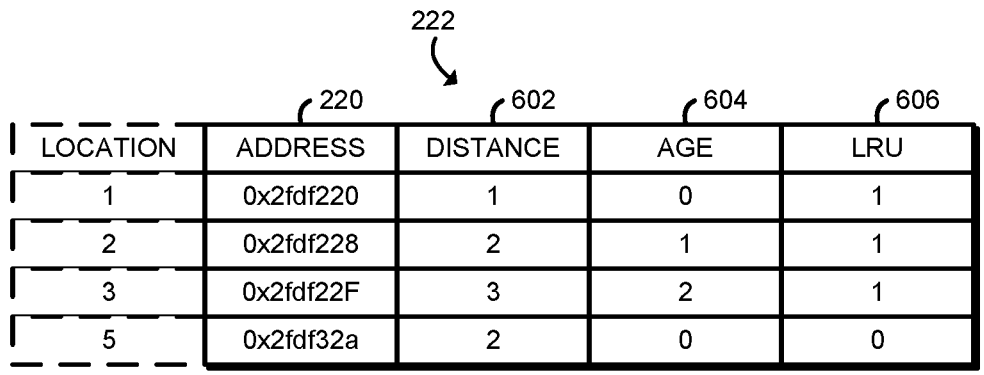

Referring back to FIG. 4, after the processor 110 has selected the cache line 220 from the determined set of cache lines 220 for eviction, the method 400 advances to block 410. In block 410, the processor 110 evicts the data from the selected cache line 220. Additionally, in block 412, the processor 110 decrements the age value of each cache line 220 that was not evicted. For example, the illustrative metadata 222 from FIG. 6 is shown in FIG. 7 after eviction of the data from the cache line 220 associated with location 4 (which may or may not include new data, but is not shown in FIG. 7 for clarity). As shown, the age value 604 of each cache line 220 has been decremented by one. As such, during the next eviction process, the processor 110 will select the cache lines 220 associated with locations 1 and 5 for possible eviction, assuming no change in the age values 604, because those cache lines 220 have the lowest age value 604. Of course, it should be appreciated that in some embodiments the age value 604 associated with non-evicted cache lines may be incremented in block 414 up to an upper threshold, rather than decremented. In such embodiments, the processor 110 is configured to select those cache lines 220 having the highest age value 604 for possible eviction in block 414. Regardless, after the data has been evicted from the selected cache line 220 in block 410, the method 400 loops back to block 402 in which the processor 110 determines whether additional cache lines 220 are to be evicted as discussed above.

Figure 5:
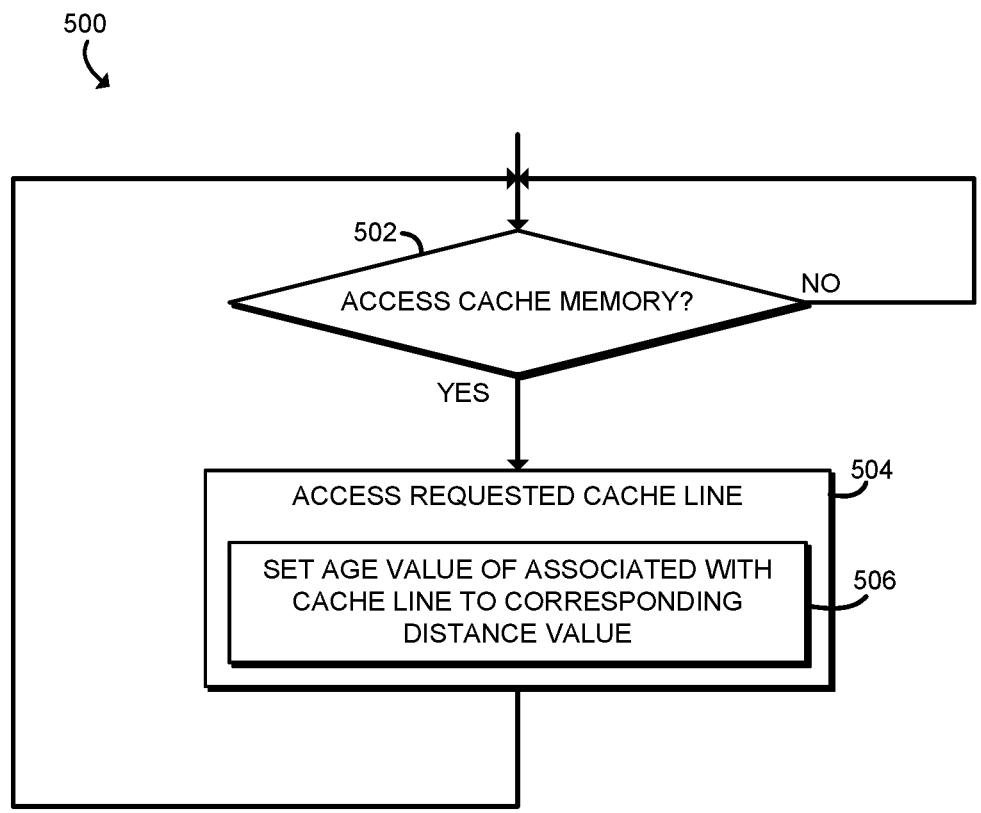
FIG. 5 is a simplified flow diagram of at least one embodiment of a method for accessing cache memory that may be executed by the processor of FIG. 2.
Figure 8:
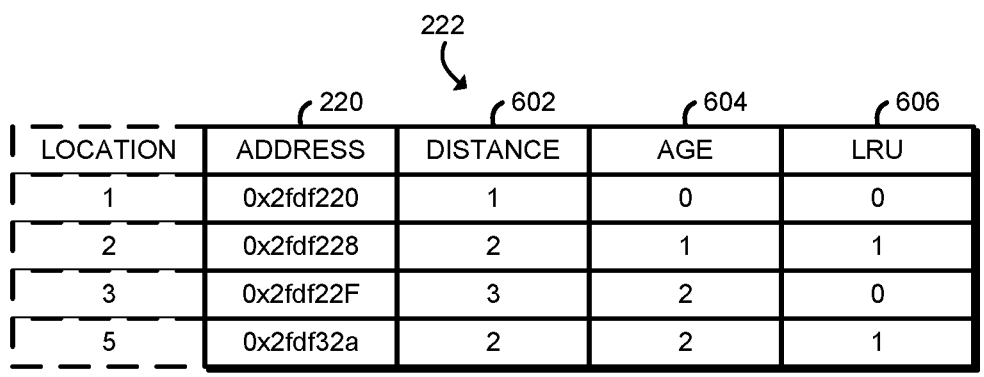

Although the age value associated with each non-evicted cache line 220 is decremented upon eviction of a cache line 220, the processor 110 also resets the age value of each cache line 220 to the distance value if the cache line 220 is accessed in block 302 of FIG. 3. To do so, the processor 110 may execute a method 500 as shown in FIG. 5 for accessing data stored in the associated cache memory 150, which may be executed contemporaneously with the method 300 for retrieving data from a non-cache memory resource of the distributed shared memory system 100. The method 500 begins with block 502. In which the processor 110 determines whether to access the cache memory 150. For example, the processor 110 may access the cache memory 150 in response to execution of a software application or the like. If so, the method 500 advances to block 504 in which the processor 110 accesses the requested cache line 220 to retrieve the associated data. In doing so, the processor 110 resets the age value associated with the cache line 220 from which the data was retrieved to the corresponding distance value in block 506. For example, the illustrative metadata 222 from FIG. 7 is shown in FIG. 8 after the cache line 220 associated with location 5 has been accessed. As shown, the age value 604 associated with that cache line 220 has been reset from a previous value of 0 to the distance value 602 of 2 in response to the memory access. In this way, cache lines 220 that are frequently accessed will be considered for eviction less often.

Figure 9:
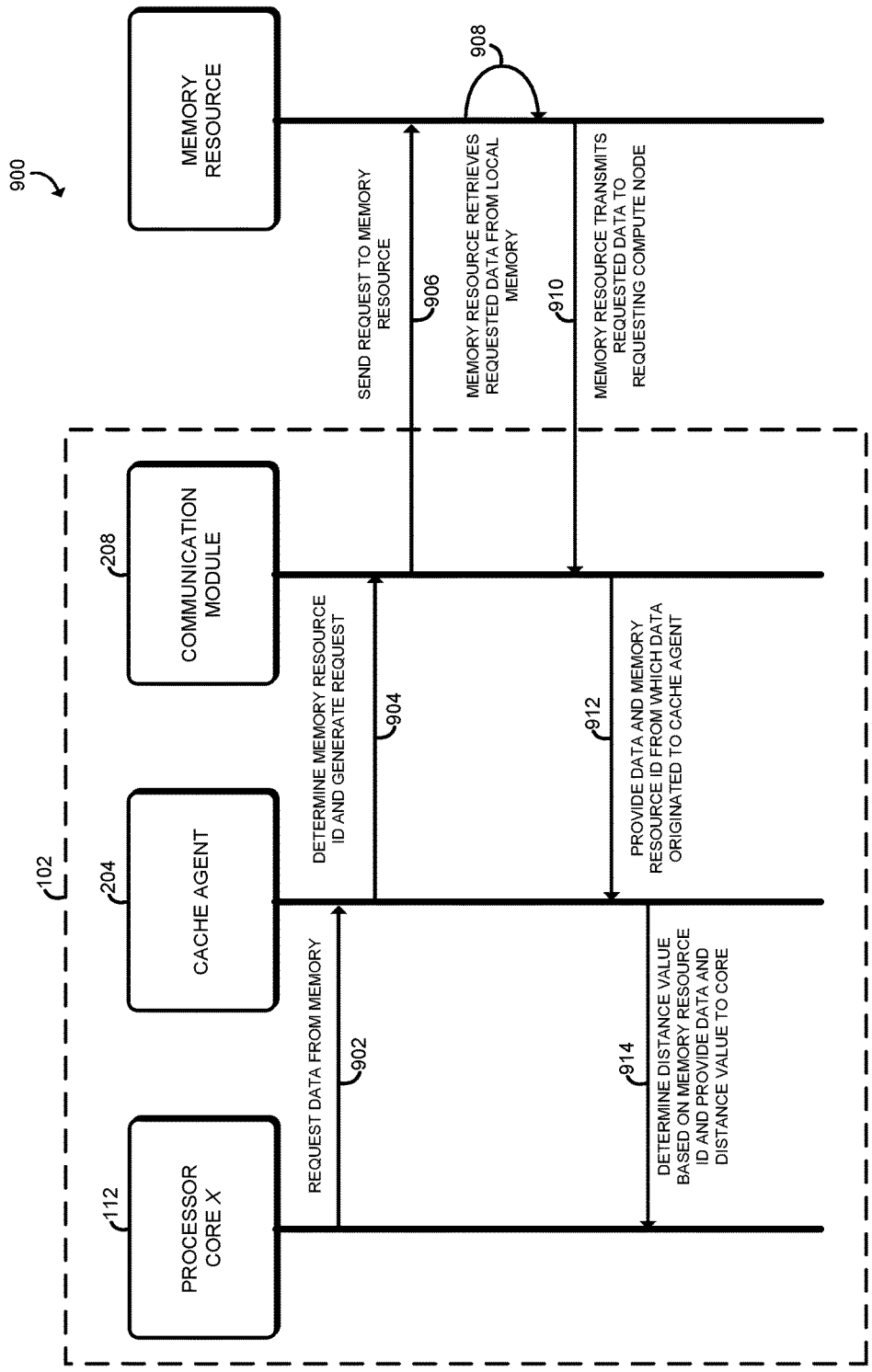
FIG. 9 is a simplified communication flow diagram of a compute node and memory resource during execution of the method for retrieving data from a memory resource of FIG. 3.

Referring now to FIG. 9, an illustrative communication flow 900 of the distributed shared memory system 100 for retrieving data from a memory resource of the system 100 is shown. In the illustrative example of FIG. 9, the communication flow 900 corresponds the method 300 described above in regard to FIG. 9. The illustrative communication flow 900 includes a number of data flow, some of which may be executed separately or together, depending on the embodiment. In data flow 902, a processor core 112 of a processor 110 of the compute node 102 requests data from the cache agent 204. The requested data may be requested or required by, for example, an application or service running on the corresponding processor core 112. The cache agent 204 determines whether the requested data is stored in the local cache memory 150 and, if not, determines the identification of the memory resource at which the requested data is stored and generates a data flow 904 to request the data from the identified memory resource. The data flow 904 is received by the communication module 208, which generates a data flow 906 to request the data from the identified memory resources. The memory resource retrieves the requested data from local memory at data flow 908 and transmits the requested data to the requesting compute node 102 in data flow 910. The communication module 208 receives the requested data and provides the requested data and the identification of the memory resource to the cache agent 204 in data flow 912. The cache agent 204 determines the distance value for the data and provides the data and the distance value to the requesting processor core 112 in data flow 914. As discussed above, the cache agent 204 may determine the distance value by comparing the identification of the memory resource from which the data was obtained to the source distance database 250 to determine the assigned distance value.

Reference to memory devices can apply to different memory types, and in particular, any memory that has a bank group architecture. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR4 (DDR version 4, initial specification published in September 2012 by JEDEC), DDR4E (in development by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014). HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device, for such devices that have a bank group architecture. In one embodiment, the nonvolatile memory device is a block addressable memory device, such as NAND or NOR technologies. Thus, a memory device can also include a future generation nonvolatile devices, such as a three dimensional crosspoint memory device, or other byte addressable nonvolatile memory device. In one embodiment, the memory device can be or include multi-threshold level NAND flash memory, NOR flash memory, single or multi-level Phase Change Memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

EXAMPLES

Illustrative examples of the technologies disclosed herein are provided below. An embodiment of the technologies may include any one or more, and any combination of, the examples described below.

Example 1 includes a compute node to manage cache memory, the compute node comprising a processor; a cache memory associated with the processor, the cache memory having a plurality of cache lines for storing data; and a memory to store metadata associated with one or more cache lines, wherein the metadata comprises an age field and a distance field, the distance field to store a distance value to indicate a distance of a memory resource, relative to the compute node, from which data stored in the corresponding cache line originates, and the age field to store an age value that is based at least in part on (i) the distance value and (ii) the number of times for which a corresponding cache line has been considered for eviction since a previous eviction of the corresponding cache line.

Example 2 includes the subject matter of Example 1, and further including an eviction module to determine one or more cache lines of the cache memory of the processor for consideration for eviction based on the age value associated with a cache line; select a cache line for eviction from the one or more cache lines based on an eviction policy; and evict content stored in the selected cache line from the cache memory.

Example 3 includes the subject matter of any of Examples 1 and 2, and further including a cache agent to access another cache line of the cache memory; and update the age value associated with the another cache line in response to accessing the another cache line.

Example 4 includes the subject matter of any of Examples 1-3, and wherein to update the age value comprises to set the age value associated with the another cache line to the distance value associated with the another cache line in response to access of the another cache line.

Example 5 includes the subject matter of any of Examples 1-4, and wherein to determine one or more cache lines based on the age value comprises to select each cache line of the cache memory having a lowest age value.

Example 6 includes the subject matter of any of Examples 1-5, and wherein to select the one or more cache lines for eviction comprises to select a cache line for eviction from the plurality of cache lines of based on a Least Recently Used eviction policy.

Example 7 includes the subject matter of any of Examples 1-6, and wherein to select the cache line for eviction comprises to select a cache line for eviction from the one or more cache lines based on the recency at which the cache line was last accessed.

Example 8 includes the subject matter of any of Examples 1-7, and wherein the processor is to update the age value associated with one or more cache lines of the cache memory that were not selected for eviction.

Example 9 includes the subject matter of any of Examples 1-8, and wherein to update the age value associated with one or more cache lines of the cache memory that were not selected for eviction comprises to decrement the age value associated with one or more cache lines of the cache memory that were not selected for eviction.

Example 10 includes the subject matter of any of Examples 1-9, and further including a cache agent to request data from a memory resource of the distributed shared memory system; receive the requested data, wherein the requested data includes a source identification that identifies the memory resource from which the data originated; determine a distance value associated with the received data based on the source identification; and store the received data in another cache line of the cache memory, wherein to store the received data includes to store the distance value in a distance field of metadata associated with the another cache line.

Example 11 includes the subject matter of any of Examples 1-10, and wherein to determine the distance value comprises to compare the source identification to a source distance database, wherein the source distance database identifies a distance value for each source identification.

Example 12 includes the subject matter of any of Examples 1-11, and wherein to determine the distance value comprises to determine a communication latency associated with receiving the requested data from the memory resource.

Example 13 includes the subject matter of any of Examples 1-12, and wherein to store the received data in the another cache line further includes to set the age value of the metadata associated with the another cache line to the distance value.

Example 14 includes the subject matter of any of Examples 1-13, and wherein the distance value associated with memory resources farther away from the compute node are greater than distance values associated with memory resources closer to the compute node.

Example 15 includes the subject matter of any of Examples 1-14, and wherein the distance value is indicative of a communication latency associated with the memory resource from which data stored in the corresponding cache line originates.

Example 16 includes a method for managing cache memory of a processor of a compute node of a distributed shared memory system, the method comprising determining, by the processor, one or more cache lines of the cache memory of the processor for consideration for eviction based on an age value associated with each cache line, wherein the age value is based at least in part on (i) a distance of a memory resource from which the data stored in the corresponding cache line originates and (ii) the number of times for which the corresponding cache lines have been considered for eviction since a previous eviction of the corresponding cache lines; selecting, by the processor, a cache line for eviction from the one or more cache lines based on an eviction policy; and evicting, by the processor, the selected cache line from the cache memory.

Example 17 includes the subject matter of Example 16, and wherein a memory of the compute node includes metadata associated with one or more cache lines of the cache memory, and the metadata comprises an age field in which the age value of the corresponding cache line is located and a distance field in which a distance value associated with the corresponding cache line is located, wherein the distance value is to indicate a distance of a memory resource, relative to the compute node, from which data stored in the corresponding chance line originates.

Example 18 includes the subject matter of any of Examples 16 and 17, and further including accessing, by the processor, another cache line of the cache memory; and updating the age value associated with the another cache line in response to accessing the another cache line.

Example 19 includes the subject matter of any of Examples 16-18, and wherein updating the age value comprises setting the age value associated with the another cache line to the distance value associated with the another cache line in response to accessing the another cache line.

Example 20 includes the subject matter of any of Examples 16-19, and wherein the distance value associated with memory resources farther away from the compute node are greater than distance values associated with memory resources closer to the compute node.

Example 21 includes the subject matter of any of Examples 16-20, and wherein the distance value is to indicate a communication latency associated with the memory resource from which data stored in the corresponding cache line originates.

Example 22 includes the subject matter of any of Examples 16-21, and wherein determining the one or more cache lines based on the age value comprises selecting one or more cache lines of the cache memory having a lowest age value.

Example 23 includes the subject matter of any of Examples 16-22, and wherein selecting the cache line for eviction comprises selecting a cache line for eviction from the one or more of cache lines based on a Least Recently Used eviction policy.

Example 24 includes the subject matter of any of Examples 16-23, and wherein selecting the cache line for eviction comprises selecting a cache line for eviction from the one or more cache lines based on the recency at which the cache line was last accessed.

Example 25 includes the subject matter of any of Examples 16-24, and further including updating, by the processor, the age value associated with one or more cache lines of the cache memory that was not selected for eviction.

Example 26 includes the subject matter of any of Examples 16-25, and wherein updating the age value associated with the one or more cache lines of the cache memory that was not selected for eviction comprises decrementing the age value associated with one or more cache lines of the cache memory that was not selected for eviction.

Example 27 includes the subject matter of any of Examples 16-26, and further including requesting, by the processor, data from a memory resource of the distributed shared memory system; receiving, by the processor, the requested data, wherein the requested data includes a source identification that identifies with the memory resource from which the data originated; determining, by the processor, a distance value associated with the received data based on the source identification, wherein the distance value is indicative of a distance of the memory resource from the processor; and storing, by the processor, the received data in another cache line of the cache memory, wherein storing the received data includes storing the distance value in a distance field of metadata associated with the another cache line.

Example 28 includes the subject matter of any of Examples 16-27, and wherein determining the distance value comprises comparing the source identification to a source distance database, wherein the source distance database identifies a distance value for each source identification.

Example 29 includes the subject matter of any of Examples 16-28, and wherein determining the distance value comprises determining a communication latency associated with receiving the requested data from the memory resource.

Example 30 includes the subject matter of any of Examples 16-29, and wherein the metadata further comprises an age field in which the age value of the corresponding cache line is located, and wherein storing the received data in the another cache line further includes setting the age value of the metadata associated with the another cache line to the distance value.

Example 31 includes one or more machine-readable storage media comprising a plurality of instructions stored thereon that, when executed, cause a processor of a compute node to perform the method of any of Examples 16-30.

Example 32 includes a compute node for managing cache memory, the compute node comprising means for determining one or more cache lines of the cache memory of the processor for consideration for eviction based on an age value associated with each cache line, wherein the age value is based at least in part on (i) a distance of a memory resource from which the data stored in the corresponding cache line originates and (ii) the number of times for which the corresponding cache lines have been considered for eviction since a previous eviction of the corresponding cache lines; means for selecting a cache line for eviction from the one or more cache lines based on an eviction policy; and means for evicting, the selected cache line from the cache memory.

Example 33 includes the subject matter of Example 32, and wherein a memory of the compute node includes metadata associated with one or more cache lines of the cache memory, and the metadata comprises an age field in which the age value of the corresponding cache line is located and a distance field in which a distance value associated with the corresponding cache line is located, wherein the distance value is to indicate a distance of a memory resource, relative to the compute node, from which data stored in the corresponding chance line originates.

Example 34 includes the subject matter of any of Examples 31-33, and further including means for accessing another cache line of the cache memory; and means for updating the age value associated with the another cache line in response to accessing the another cache line.

Example 35 includes the subject matter of any of Examples 31-34, and wherein the means for updating the age value comprises means for setting the age value associated with the another cache line to the distance value associated with the another cache line in response to accessing the another cache line.

Example 36 includes the subject matter of any of Examples 31-35, and wherein the distance value associated with memory resources farther away from the compute node are greater than distance values associated with memory resources closer to the compute node.

Example 37 includes the subject matter of any of Examples 31-36, and wherein the distance value is to indicate a communication latency associated with the memory resource from which data stored in the corresponding cache line originates.

Example 38 includes the subject matter of any of Examples 31-37, and wherein the means for determining the one or more cache lines based on the age value comprises means for selecting one or more cache lines of the cache memory having a lowest age value.

Example 39 includes the subject matter of any of Examples 31-38, and wherein the means for selecting the cache line for eviction comprises means for selecting a cache line for eviction from the one or more of cache lines based on a Least Recently Used eviction policy.

Example 40 includes the subject matter of any of Examples 31-39, and wherein means for selecting the cache line for eviction comprises the means for selecting a cache line for eviction from the one or more cache lines based on the recency at which the cache line was last accessed.

Example 41 includes the subject matter of any of Examples 31-40, and further including means for updating the age value associated with one or more cache lines of the cache memory that was not selected for eviction.

Example 42 includes the subject matter of any of Examples 31-41, and wherein the means for updating the age value associated with the one or more cache lines of the cache memory that was not selected for eviction comprises means for decrementing the age value associated with one or more cache lines of the cache memory that was not selected for eviction.

Example 43 includes the subject matter of any of Examples 31-42, and further including means for requesting data from a memory resource of the distributed shared memory system; means for receiving the requested data, wherein the requested data includes a source identification that identifies with the memory resource from which the data originated; means for determining a distance value associated with the received data based on the source identification, wherein the distance value is indicative of a distance of the memory resource from the processor; and means for storing the received data in another cache line of the cache memory, wherein storing the received data includes storing the distance value in a distance field of metadata associated with the another cache line.

Example 44 includes the subject matter of any of Examples 31-43, and wherein means for determining the distance value comprises means for comparing the source identification to a source distance database, wherein the source distance database identifies a distance value for each source identification.

Example 45 includes the subject matter of any of Examples 31-44, and wherein means for determining the distance value comprises means for determining a communication latency associated with receiving the requested data from the memory resource.

Example 46 includes the subject matter of any of Examples 31-45, and wherein the metadata further comprises an age field in which the age value of the corresponding cache line is located, and wherein the means for storing the received data in the another cache line further includes means for setting the age value of the metadata associated with the another cache line to the distance value.

The invention claimed is:

1. A compute node to manage cache memory, the compute node comprising:
   a processor;
   a cache memory associated with the processor, the cache memory having a plurality of cache lines for storing data; and
   a memory to store metadata associated with one or more cache lines,
      wherein the metadata comprises an age field and a distance field,
      the distance field to store a distance value to indicate a distance of a memory resource, relative to the compute node, from which data stored in the corresponding cache line originates, and
      the age field to store an age value that is based at least in part on (i) the distance value and (ii) the number of times for which a corresponding cache line has been considered for eviction since a previous eviction of the corresponding cache line.

2. The compute node of claim 1, comprising an eviction module to:
   determine one or more cache lines of the cache memory of the processor for consideration for eviction based on the age value associated with a cache line;
   select a cache line for eviction from the one or more cache lines based on an eviction policy; and
   evict content stored in the selected cache line from the cache memory.

3. The compute node of claim 2, further comprising a cache agent to:
   access another cache line of the cache memory; and
   update the age value associated with the another cache line in response to accessing the another cache line.

4. The compute node of claim 3, wherein to update the age value comprises to set the age value associated with the another cache line to the distance value associated with the another cache line in response to access of the another cache line.

5. The compute node of claim 2, wherein to select the cache line for eviction comprises to select a cache line for eviction from the one or more cache lines based on the recency at which the cache line was last accessed.

6. The compute node of claim 2, wherein the processor is to update the age value associated with one or more cache lines of the cache memory that were not selected for eviction.

7. The compute node of claim 6, wherein to update the age value associated with one or more cache lines of the cache memory that were not selected for eviction comprises to decrement the age value associated with one or more cache lines of the cache memory that were not selected for eviction.

8. The compute node of claim 1, further comprising a cache agent to:
   request data from a memory resource of a distributed shared memory system;
   receive the requested data, wherein the requested data includes a source identification that identifies the memory resource from which the data originated;
   determine a distance value associated with the received requested data based on the source identification; and
   store the received requested data in another cache line of the cache memory, wherein to store the received requested data includes to store the distance value in a distance field of metadata associated with the another cache line.

9. The compute node of claim 1, wherein the distance value is indicative of a communication latency associated with the memory resource from which data stored in the corresponding cache line originates.

10. The compute node of claim 1, further comprising one or more of (i) a network interface or (ii) a display communicatively coupled to the processor.

11. A method for managing cache memory of a processor of a compute node of a distributed shared memory system, the method comprising:
   determining, by the processor, one or more cache lines of the cache memory of the processor for consideration for eviction based on an age value associated with each cache line, wherein the age value is based at least in part on (i) a distance of a memory resource from which data stored in the corresponding cache line originates and (ii) the number of times for which the corresponding cache lines have been considered for eviction since a previous eviction of the corresponding cache lines;
   selecting, by the processor, a cache line for eviction from the one or more cache lines based on an eviction policy; and
   evicting, by the processor, the selected cache line from the cache memory.

12. The method of claim 11, wherein a memory of the compute node includes metadata associated with one or more cache lines of the cache memory, and the metadata comprises an age field in which the age value of the corresponding cache line is located and a distance field in which a distance value associated with the corresponding cache line is located, wherein the distance value is to indicate a distance of a memory resource, relative to the compute node, from which data stored in the corresponding cache line originates.

13. The method of claim 12, further comprising:
   accessing, by the processor, another cache line of the cache memory; and
   updating the age value associated with the another cache line in response to accessing the another cache line.

14. The method of claim 13, wherein updating the age value comprises setting the age value associated with the another cache line to the distance value associated with the another cache line in response to accessing the another cache line.

15. The method of claim 12, wherein the distance value is to indicate a communication latency associated with the memory resource from which data stored in the corresponding cache line originates.

16. The method of claim 11, wherein determining the one or more cache lines based on the age value comprises selecting one or more cache lines of the cache memory having a lowest age value.

17. The method of claim 11, further comprising decrementing, by the processor, the age value associated with one or more cache lines of the cache memory that was not selected for eviction.

18. The method of claim 11, further comprising:
requesting, by the processor, data from a memory resource of the distributed shared memory system;
receiving, by the processor, the requested data, wherein the requested data includes a source identification that identifies with the memory resource from which the data originated;
determining, by the processor, a distance value associated with the received requested data based on the source identification, wherein the distance value is indicative of a distance of the memory resource from the processor; and
storing, by the processor, received requested data in another cache line of the cache memory, wherein storing received requested data includes storing the distance value in a distance field of metadata associated with the another cache line.

19. One or more machine-readable storage media comprising a plurality of instructions stored thereon that, when executed, cause one or more processors of a compute node to:
determine one or more cache lines of a cache memory of the one or more processors for consideration for eviction based on an age value associated with each cache line, wherein the age value is based at least in part on (i) a distance of a memory resource from which data stored in the corresponding cache line originates and (ii) the number of times for which the corresponding cache lines have been considered for eviction since a previous eviction of the corresponding cache lines;
select a cache line for eviction from a set of cache lines based on an eviction policy; and
evict the selected cache line from the cache memory.

20. The one or more machine-readable storage media of claim 19, wherein a memory of the compute node includes metadata associated with one or more cache lines of the cache memory, and the metadata comprises an age field in which the age value of the corresponding cache line is located and a distance field in which a distance value corresponding to the cache line is located, wherein the distance value is to indicate a distance of a memory resource, relative to the compute node, from which data stored in the corresponding cache line originates.

21. The one or more machine-readable storage media of claim 20, wherein the plurality of instructions, when executed, further cause the one or more processors to:
access another cache line of the cache memory; and
update the age value associated with the another cache line in response to accessing the another cache line.

22. The one or more machine-readable storage media of claim 21, wherein to update the age value comprises to set the age value associated with the another cache line to the distance value associated with the another cache line in response to accessing the another cache line.

23. The one or more machine-readable storage media of claim 20, wherein the distance value is to indicate a communication latency associated with the memory resource from which data stored in the corresponding cache line originates.

24. The one or more machine-readable storage media of claim 19, wherein to determine the one or more cache lines based on the age value comprises to select one or more cache lines of the cache memory having a lowest age value.

25. The one or more machine-readable storage media of claim 19, wherein the plurality of instructions, when executed, further cause the one or more processors to decrement the age value associated with one or more cache lines of the cache memory that was not selected for eviction.

26. The one or more machine-readable storage media of claim 19, wherein the plurality of instructions, when executed, further cause the one or more processors to:
request data from a memory resource of a distributed shared memory system;
receive the requested data, wherein the requested data includes a source identification that identifies with the memory resource from which the received requested data originated;
determine a distance value associated with the received requested data based on the source identification, wherein the distance value is indicative of a distance of the memory resource from the one or more processors; and
store the received requested data in another cache line of the cache memory, wherein storing the received requested data includes storing the distance value in a distance field of metadata associated with the another cache line.

* * * * *